No. 12,663. REISSUED JUNE 25, 1907.
J. B. BARNES.
SCUMMER AND BLOW-OFF FOR STEAM BOILERS.
APPLICATION FILED MAY 2, 1907.
2 SHEETS—SHEET 1.
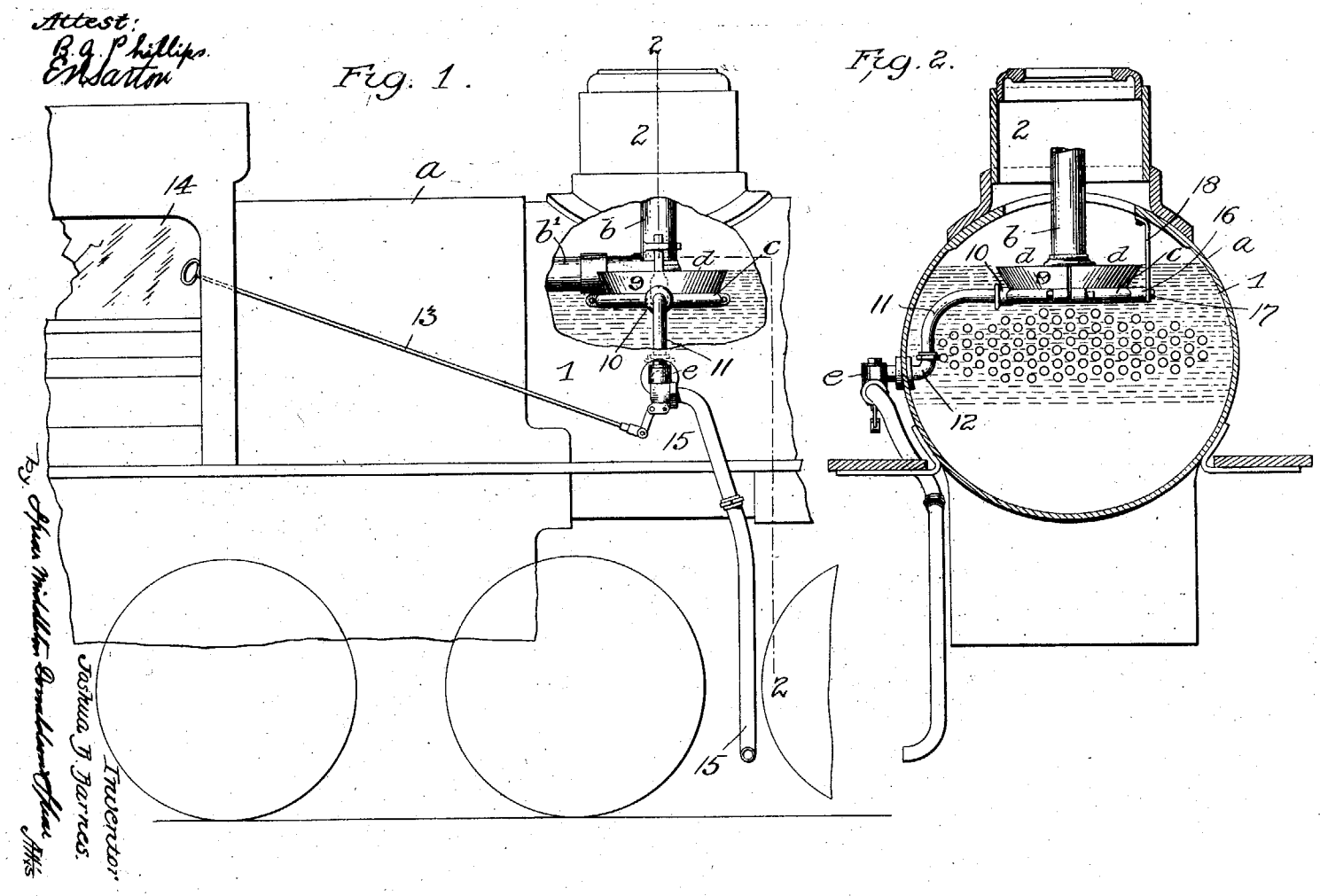
THE NORRIS PETERS CO., WASHINGTON, D. C.

No. 12,663. REISSUED JUNE 25, 1907.

J. B. BARNES.

SCUMMER AND BLOW-OFF FOR STEAM BOILERS.

APPLICATION FILED MAY 2, 1907.

2 SHEETS—SHEET 2.

Inventor
Joshua B. Barnes.

Attest:
B. G. Phillips
C. M. Barton

By Spear Middleton Donaldson & Spear
Att'ys.

THE NORRIS PETERS CO., WASHINGTON, D. C.

UNITED STATES PATENT OFFICE.

JOSHUA B. BARNES, OF SPRINGFIELD, ILLINOIS.

SCUMMER AND BLOW-OFF FOR STEAM-BOILERS.

No. 12,663. Specification of Reissued Letters Patent. Reissued June 25, 1907.

Original No. 842,164, dated January 29, 1907. Application for reissue filed May 2, 1907. Serial No. 371,552.

*To all whom it may concern:*

Be it known that I, JOSHUA B. BARNES, a citizen of the United States, residing at Springfield, in the county of Sangamon and State of Illinois, have invented a new and useful Combined Scummer and Blow-Off Valve for Steam-Boilers, of which the following is a specification.

My invention relates to a device combined with a blow-off valve for steam boilers, and especially applicable to a locomotive boiler for collecting and expelling the scum and scale producing matter from the surface of the water in the boiler, and thereby preventing "foaming" and deposit of sediment and consequent formation of scale on the flues and plates of the boiler.

The invention consists in features of novelty, as hereinafter described and claimed, reference being had to the accompanying drawings, forming part of this specification, whereon—

Figure 3:
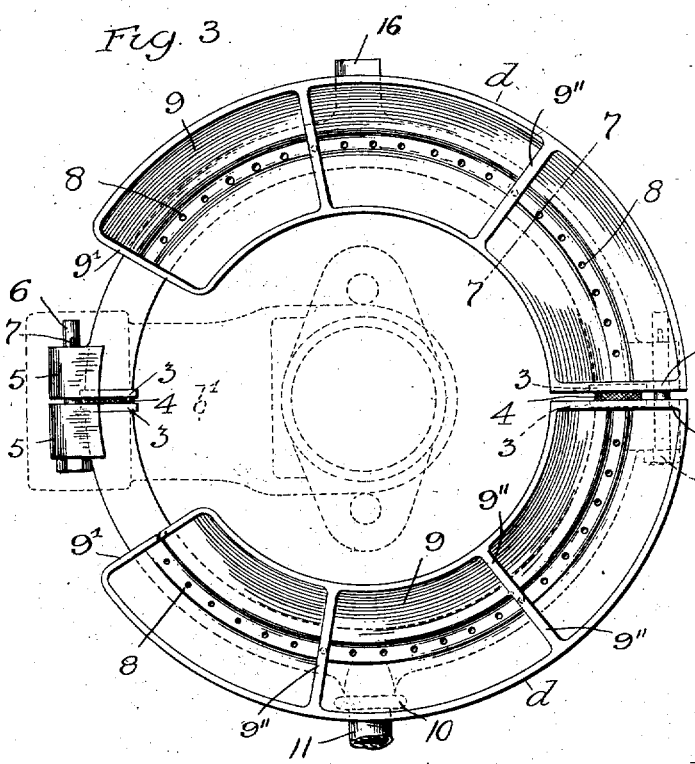
Figure 6:
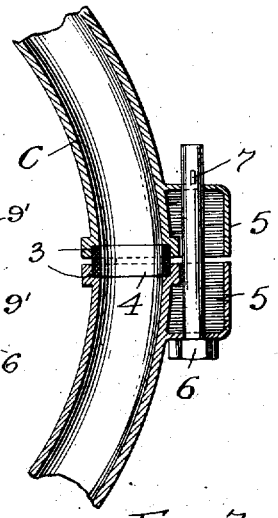
Figure 7:
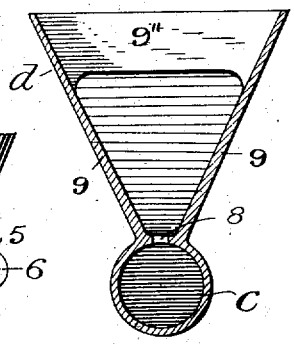
Figure 4:
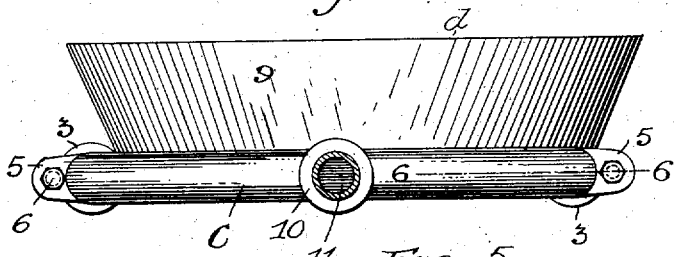
Figure 5:
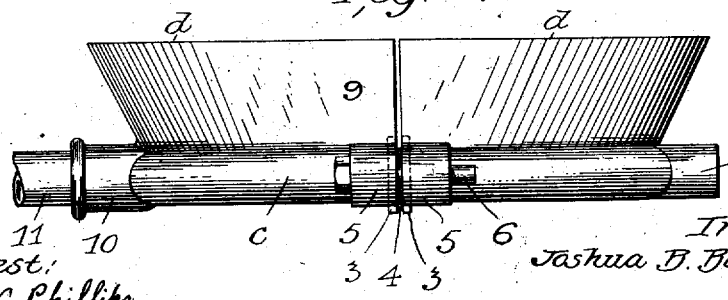

Figure 1 is a side elevation of the fire-box end portion and steam dome of a locomotive boiler having my combined scummer and blow-off valve applied thereto; Fig. 2, a vertical transverse section through the boiler on line 2 2 in Fig. 1, showing the scummer and combined parts of the device in corresponding elevation; Fig. 3 a top plan view, to enlarged scale, of the scummer, forming part of my invention, detached; Fig. 4 a side elevation thereof; Fig. 5 a similar view of the same at right angles to Fig. 4 and corresponding to that seen in Fig. 2; Fig. 6, a horizontal section, to enlarged scale, through one of the joints between the sections of the scummer on line 6 6 in Fig. 4; and Fig. 7 a vertical transverse section through the scummer on line 7 7 in Fig. 3.

Like letters and numerals of reference denote like parts in all the figures.

*a* represents the rear or fire box end portion of a locomotive boiler having its cylindrical shell 1, adjacent to the steam dome 2, as seen in Fig. 1, broken away to show the interior of the boiler thereat.

*b* is the throttle stand pipe, (broken away in Fig. 2) and *b'* the dry pipe therefrom to the engine. Beneath and adjacent to the pipes *b* and *b'* is a horizontal pipe *c*, which is preferably endless and arranged in a circle around and concentric with the vertical center line of the stand pipe *b*, (or eccentric thereto, as the location of the stand-pipe may determine.)

The pipe *c* in the present case is made, preferably, of malleable cast iron in two semicircular sections which communicate with each other and are jointed together in any suitable manner, but preferably as follows: In the ends respectively of each section is formed a circular socket 3, which is adapted to receive the corresponding end portion of a ring 4, composed preferably, of Babbitt metal, (or other suitable material) and on the outside of the section adjacent to each socket 3 is formed an ear or lug 5, whereby when the two sections of the pipe *c* are assembled, as seen particularly in Figs. 3 and 6, with the sockets 3 and lugs 5 of one section opposite to the sockets 3 and lugs 5 of the other section, the inner shoulders of the opposite sockets 3 are closed against the annular edges of the interposed rings 4 and held thereto so as to form a tight joint between the sections of the pipe *c* by bolts 6, which are passed through the opposite lugs 5 and tightened thereto by keys (or nuts) 7 as shown.

Through the wall of the pipe *c* at suitable intervals along the top are holes 8, opening from the interior of the pipe *c* into the bottom part of preferably two circular segmental troughs *d*, which correspond to the sections of the perforated pipe *c*, and are in the present case integral therewith, but may be of separate construction and fixed thereon in any suitable manner. The side walls 9 of each trough *d* incline upward and outward from and to a suitable height above the perforated pipe *c* and are united to each other by the end walls 9' and by intermediate upper braces 9'', which are preferably integral with the side walls 9, but may be of separate construction and riveted or otherwise fixed thereto, or the troughs *d* may be otherwise shaped or dispensed with entirely and the perforated pipe *c* only used.

In the pipe *c* at one side is a branch 10, which is connected by a pipe 11 with an elbow 12, fixed to the inside of the boiler shell 1 at a suitable depth below the water line and communicating with the inlet branch of a suitable blow-off valve *e*, preferably that described in my application for Letters Patent filed January 8, 1906, Serial No. 295,102, which is fixed to the outside of the boiler shell 1 and operated by a rod 13, extending therefrom to the cab 14 within reach of the engineer, the outlet of the valve *e* communicating with a pipe 15, which extends downward therefrom and opens at its lower end into the atmosphere at any convenient point below the bolier *a*. On the opposite side of the pipe *c* is a boss or stud 16, to which is fixed by a screw 17 the lower end of an upright hanger 18, having its upper end fixed to the crown of the boiler shell 1, the hanger 18 and the pipe 11 supporting the pipe *c* with its troughs *d* in the proper position, or so that the upper edge of the troughs *d* is level, or thereabout, with the normal water-line within the boiler *a*, as shown.

In operation the steam in passing from the steam dome 2 through the throttle-valve and stand-pipe *b* induces a suction and concentration of the matter held in suspension or floating at the surface of the water in the boiler *a* toward the troughs *d*, into which it is drawn and deposited at the bottom thereof onto the perforated portion of the pipe *c*, and thereby prevented from settling and accumulating in the form of scale on the flues and plates of the boiler, and by opening the blow-off valve *e* at suitable intervals the impurities are expelled from the troughs *d*, through the holes 8, into the pipe *c*, and thence through the pipe 11, valve *e*, and pipe 15 to waste. It is to be here noted, as before mentioned, that if desired the perforated pipe *c* may be used without the collecting troughs *d*, in which case the top of the pipe *c* is arranged at the normal level of the water in the boiler, the impurities being drawn by the suction of the steam thereat over the holes 8 of the pipe *c* and expelled therethrough and from the pipe *c* by the operation of the blow-off valve *e* in the same manner and on the same principle as before described.

By this invention foaming and the formation of scale in the boiler are prevented and the frequent washing out thereof rendered unnecessary, thereby saving time and money. Moreover, the liability of the fire box to crack owing to sudden contraction and expansion from extreme changes of temperature in washing out the boiler is greatly reduced and the strength and life of the boiler consequently maintained.

What I claim as my invention, and desire to secure by Letters Patent, is:—

1. In a steam boiler the combination with the dry pipe of a scum collecting device having portions located on diametrically opposite sides of said dry pipe so as to collect the scum and floating impurities drawn thither by the steam in its flow toward the outlet, and a blow-off connected with said collector, substantially as described.

2. In combination with a steam boiler, an annular scum collecting device located in proximity to the steam outlet and a blow-off pipe communicating with said scum collecting device, substantially as described.

3. In combination with a steam boiler having a steam dome and dry pipe, a scum collecting trough concentrically arranged with relation to said dome, and a blow-off pipe for removing the scum and impurities collected by said trough, substantially as described.

4. In combination with a steam boiler having a steam dome and dry pipe constituting the steam outlet, a scum collecting trough encircling said dry pipe and means for removing the scum and impurities collected by said trough, substantially as described.

5. In a device of the character described, the combination with a steam boiler, of an endless pipe, arranged horizontally therein, a trough located above the said pipe adjacent to the steam outlet from the boiler, and having openings through the bottom into the said pipe, the said trough having its upper edge on a level or thereabout with the surface of the water in the boiler, a suitable blow-off valve fixed to the outside of the boiler and in communication with the said pipe, means for supporting the said pipe within the boiler, and for operating the said valve, substantially as described and for the purpose set forth.

6. In a device of the character described, the combination with a steam boiler, of an endless pipe arranged horizontally circularwise within the boiler adjacent to the steam outlet therefrom, and having perforations through its wall along the top, a trough having its bottom formed by the perforated portion of the said pipe and having its upper edge on a level or thereabout with the surface of the water in the boiler, a suitable blow-off valve fixed to the outside of the boiler and in communication with the said pipe, means for supporting the said pipe within the boiler, and for operating the said valve, substantially as described and for the purpose set forth.

7. In a device of the character described, the combination with a steam boiler, of a pipe arranged horizontally therein, and having perforations through its wall along the top, a trough having its bottom formed by the perforated portion of the said pipe, and having its upper edge on a level or thereabout with the surface of the water in the boiler, and a suitable blow-off valve in communication with the said pipe substantially as described.

In witness whereof I have signed my name to this specification in the presence of two subscribing witnesses.

JOSHUA B. BARNES.

Witnesses:
A. B. MARS,
E. R. JEFFERY.